(12) United States Patent
Lin et al.

(10) Patent No.: US 10,491,812 B2
(45) Date of Patent: Nov. 26, 2019

(54) WORKLOAD SCHEDULER FOR COMPUTING DEVICES WITH CAMERA

(71) Applicant: INTEL CORPORATION, Santa Clara, CA (US)

(72) Inventors: Yunbiao Lin, Shanghai (CN); Jianhui Dai, Shanghai (CN); Ning Luo, Shanghai (CN); Chunbo Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 15/550,699

(22) PCT Filed: Mar. 23, 2015

(86) PCT No.: PCT/CN2015/074836
§ 371 (c)(1),
(2) Date: Aug. 11, 2017

(87) PCT Pub. No.: WO2016/149894
PCT Pub. Date: Sep. 29, 2016

(65) Prior Publication Data
US 2018/0027177 A1  Jan. 25, 2018

(51) Int. Cl.
*H04N 5/232* (2006.01)
*G06F 9/48* (2006.01)
(Continued)

(52) U.S. Cl.
CPC ....... *H04N 5/23229* (2013.01); *G06F 9/4881* (2013.01); *G06F 9/505* (2013.01);
(Continued)

(58) Field of Classification Search
CPC .. H04N 5/23229; H04N 5/23216; H04N 5/76; H04N 5/232; H04N 5/23241;
(Continued)

(56) References Cited

U.S. PATENT DOCUMENTS 8,350,791 B2 * 1/2013 Takahashi ............. H04N 5/232
345/87
2006/0050155 A1  3/2006 Ing et al.
(Continued)

FOREIGN PATENT DOCUMENTS

CN   103268263 A   8/2013
CN   103503528 A   1/2014

OTHER PUBLICATIONS

Extended European Search Report received for EP Application No. 15885833, dated Oct. 2, 2018. 11 pages.
(Continued)

*Primary Examiner* — Luong T Nguyen
(74) *Attorney, Agent, or Firm* — Finch & Maloney PLLC (57) ABSTRACT

Techniques are disclosed to control a camera device such that memory contention and power consumption is reduced during video processing routines, generally referred to herein as media tasks. In particular, a workload scheduler is implemented in a camera HAL and is configured to dispatch captured image frames in an alternating manner between competing media tasks such that the processing of those image frames is performed sequentially, and thus, eliminates or otherwise mitigates memory contention. To this end, techniques variously disclosed herein can be used to enable low-cost, low-memory configured devices to perform concurrent media tasks on captured high-definition video at high framerates, without an undesirable decrease in performance and an increase in power consumption.

22 Claims, 6 Drawing Sheets

(51) Int. Cl.
  *G06F 9/50*     (2006.01)
  *H04N 5/225*    (2006.01)
  *H04N 5/76*     (2006.01)
  *H04N 5/77*     (2006.01)
  *H04N 5/376*    (2011.01)

(52) U.S. Cl.
  CPC ........... *H04N 5/2257* (2013.01); *H04N 5/232* (2013.01); *H04N 5/23216* (2013.01); *H04N 5/23245* (2013.01); *H04N 5/76* (2013.01); *H04N 5/772* (2013.01); *H04N 5/23241* (2013.01); *H04N 5/23293* (2013.01); *H04N 5/3765* (2013.01)

(58) Field of Classification Search
  CPC .. H04N 5/772; H04N 5/23293; H04N 5/2257; H04N 5/23245; H04N 5/3765; G06F 9/4881; G06F 9/505
  See application file for complete search history.

(56) References Cited

U.S. PATENT DOCUMENTS

| | | | | |
|---|---|---|---|---|
| 2007/0088983 A1* | 4/2007 | Riemens | ............... | G06F 11/349 714/30 |
| 2007/0156947 A1* | 7/2007 | Vaithiananthan | ... | G06F 12/1072 711/5 |
| 2008/0165268 A1 | 7/2008 | Takahashi et al. | | |
| 2011/0178820 A1* | 7/2011 | Soni | ..................... | A61B 5/0002 705/3 |
| 2011/0194617 A1 | 8/2011 | Kumar et al. | | |
| 2012/0254822 A1* | 10/2012 | Lin | ....................... | G06F 9/5083 717/101 |
| 2014/0035938 A1* | 2/2014 | Wang | ............... | H04N 21/42607 345/520 |
| 2014/0267811 A1 | 9/2014 | Bhat et al. | | |
| 2015/0161951 A1* | 6/2015 | Seki | ......................... | G09G 3/36 345/102 |

OTHER PUBLICATIONS

Kawakami, et al., "Real-time Extension for Windows NT/CE used for Control Systems," SICE 2000, Jul. 26-28, 2000. pp. 319-324.
Zhang, Yong, "Design and Implementation of Wireless Sensor Network Node Based on .Net Micro Framework," IEEE, 2010. 3 pages.
International Search Report and Written Opinion received for PCT/CN2015/074836. dated Dec. 21, 2015. 11 pages.
International Preliminary Report on Patentability received for PCT/CN2015/074836. dated Sep. 26, 2017. 5 pages.

* cited by examiner

WORKLOAD SCHEDULER FOR COMPUTING DEVICES WITH CAMERA

BACKGROUND

Cameras have become ubiquitous elements in mobile electronic devices such as smart phones, tablets, and laptops. Within these electronic devices, camera hardware including an image sensor, flash, post-processing stages and control algorithms, collectively known as a camera pipeline, are controlled by a camera subsystem. The camera subsystem enables user-applications and processes executed on these devices to control various aspects of image capture including resolution, pixel format, frame rate, and encoding routines, just to name a few. However, to support cross-platform compatibility between different manufacturers of camera pipeline components, electronic devices generally include a camera hardware abstraction layer (HAL) that enables application frameworks to make standard interface calls such that camera hardware is accessed in a virtual manner, and not in a direct manner that is proprietary or otherwise specific to a particular image sensor and image signal processor (ISP) scheme. Some such example application frameworks include libraries implemented within mobile operating systems (e.g., Android OS by Google, Inc., Windows Mobile by Microsoft, Inc., and iOS by Apple, Inc.) that enable user-applications to access an application programming interface (API) to, for example, enumerate available camera devices, initiate image capture, configure capture modes (e.g., still capture, burst capture, video capture), set image quality and frame rates, and subscribe to camera events (e.g., low-light alerts, image data available events). During image capture, the maximum resolution and frame rate that can be supported by a camera subsystem is a function of several factors including requested resolution of output image streams, availability of binning/skipping modes of the image sensor, and the overall workload bandwidth governed by the available random access memory (RAM), and GPU capabilities of a given device.

DETAILED DESCRIPTION

Techniques are disclosed to control a camera device such that memory contention and power consumption is minimized or otherwise reduced during competing video processing routines, generally referred to herein as media tasks. An example of competing media tasks includes, for instance, the case where the camera is simultaneously generating a live-preview in a viewing display of camera, and also recording the content that is being live-viewed to non-volatile storage. In art embodiment, a workload scheduler is implemented in a camera hardware abstraction layer (HAL) and is configured to dispatch captured image frames in an alternating manner between such competing media tasks such that the processing of those image frames is performed sequentially, and thus, eliminates or otherwise mitigates memory contention. Other examples of media tasks include, for instance, encoding (e.g., compressing, transcoding) and transmitting image frames to a wireless display.

General Overview

Figure 1:
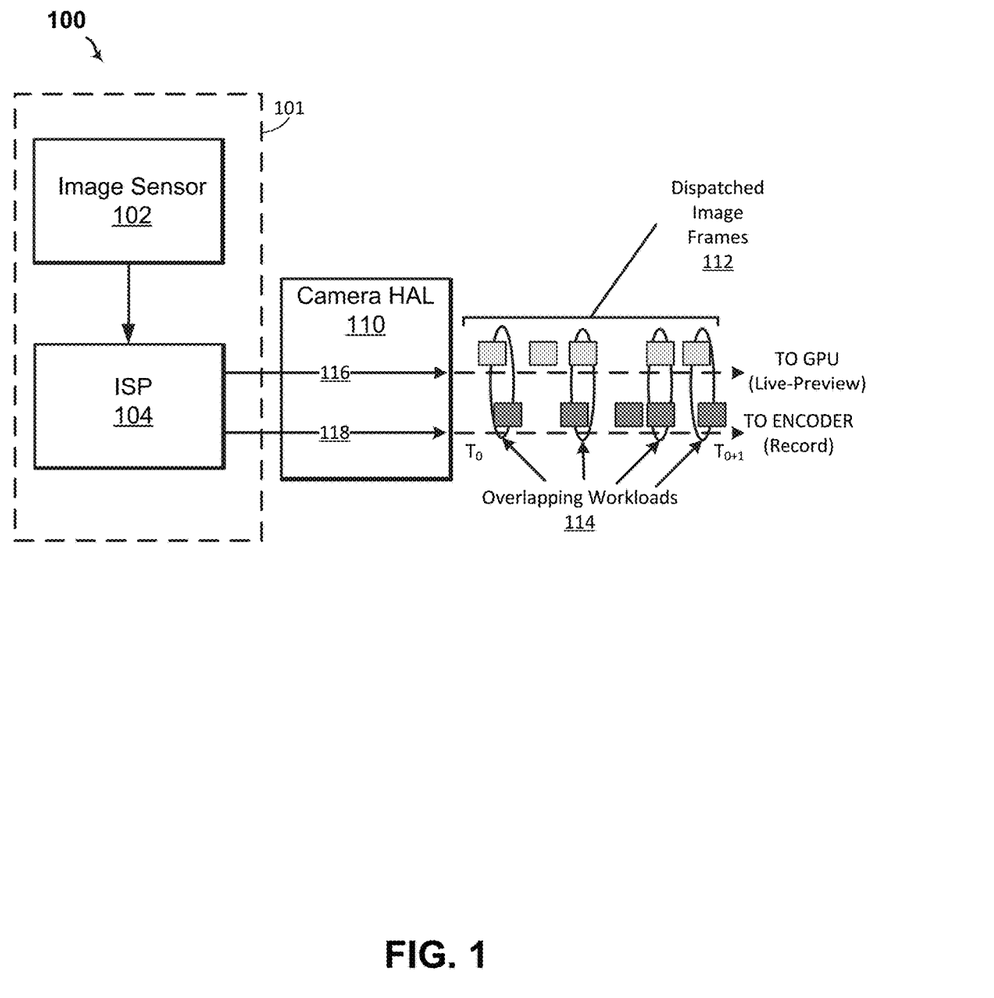
FIG. 1 shows one example of a camera pipeline implemented within a device having a suboptimal camera hardware abstraction layer (HAL).

In mobile electronic devices such as smart phones, tablets, laptops, and wearable computers, memory is often a shared resource amongst the various hardware subsystems. Within the context of a camera subsystem, this means that two or more media tasks being performed concurrently can access shared memory in an overlapping fashion, and as a consequence, experience latency-related delays due to memory contention. Unfortunately, these delays are particularly problematic in low-cost electronic devices, as these devices can generally include a relatively small amount of RAM (e.g., 1 gigabyte (GB) or less) with a single 32 bit channel. Within these low-memory bandwidth devices, concurrent media tasks that capture and process high-definition video (e.g., 1080p, 576p, 480p, or any other memory/processor intensive resolution) with high frame rates (e.g., 30 frames per second (fps) or greater) utilize a significant amount of memory during capture and processing. When two or more concurrent media tasks process such high-definition video, memory contention can cause significant latencies during the processing of each captured image frame (e.g., because of burst-mode access to memory). These latencies manifest into an extended period of processor usage (e.g., additional processor cycles), and thus, can cause an undesirable increase in overall power consumption by given device. In more detail, FIG. 1 illustrates an example of one such electronic device 100, including a camera subsystem 101 and a camera HAL 110 configured to dispatch captured image frames to competing media tasks 116 and 118. Some such examples of an electronic device 100 include a smart phone, a laptop computer, a camera device (e.g., point-and-shoot digital camera, single-lens reflex (SLR) camera), a tablet computer, a desktop computer, and a wearable computer. As shown, the electronic device 100 includes the camera subsystem 101, also generally referred to as a camera pipeline, comprising an image sensor 102 and an ISP 104. The image sensor 102 may be, for example, a complementary metal oxide semiconductor (CMOS) sensor, or in some cases, a charge coupled device (CCD). Raw image data captured by the image sensor 102 can be digitized through, for example, an analog to digital (ADC) stage (not shown). Digitized image data can be processed through the ISP 104 in order to render a human-perceivable image for storage and/or presentation. The camera HAL 110 provides a level of abstraction allowing user-applications (not shown) to execute media tasks, such as media tasks 116 and 118, in order to initiate image capture workloads. As generally referred to herein, a workload comprises a sequence of image frames captured and processed (or to be processed, as the case may be) by hardware, software, or any combination thereof, to complete a particular media task. Thus completed workloads could be accurately described as stream of image frames that are captured, dispatched and processed to carry out a particular media task. Note that a given media task may be ongoing. To this end, further note that workloads can persist until affirmatively stopped by a respective user-application that is controlling the execution of the media task, or otherwise stopped by the electronic device 100.

By way of illustration, consider a context in which the electronic device 100 is a low-cost, ultra-low power computing device with the ability to preview image data via a display, and simultaneously record the image data to a media file (e.g., in motion picture experts group (MPEG) format). To accomplish this, and as shown, the camera HAL 110 is configured to separately dispatch image frames 112 to the live-preview media task 116 and the record media task 118, in a random or otherwise unsynchronized manner. Note that each of the live-preview media task 116 and record media task 118 can include additional stages that eventually result in frames being displayed by a display, and encoded frames being recorded into a media file, respectively, but for the purpose of practicality are depicted in an abbreviated manner. Continuing the example, the electronic device 100 may be configured with a relatively small amount of shared memory, such as, for example, 1 gigabyte (GB) of single channel 32 bit double-data-rate (DDR) memory. This means that, within the context of this example, previewing and recording at high-definition resolution and high framerates may be impracticable or otherwise cause an undesirable amount of power consumption by the electronic device 100. For example, the camera HAL 110 dispatches image frames 112 in a random or otherwise uncoordinated manner, this can result in the live-preview media task 116 and the record media task 118 having a plurality of overlapping workloads 114, as shown. Recall that these workloads require various processing stages implemented in hardware and/or software that leverage shared memory to perform on-going media tasks. To this end, instances of overlapping workloads, such as the plurality of overlapping workloads 114, can cause memory contention as a GPU, a central processor unit (CPU), an ISP, or other suitable processing stage responsible for carrying out respective media tasks can write and read to the shared memory at potentially the same time. For example, such contention can be caused when a CPU or other hardware utilizes a "burst-mode" operation. Burst-mode operations are performed on data in a sequential series of memory locations, rather than have the CPU execute a new instruction to address each individual memory location. Instead, burst-mode allows the CPU to execute a single instruction specifying a starting memory address, an operation to be performed, and the length of the memory block on which to perform the operation. In a more general sense, this means that some media tasks performing complex video processing tasks will monopolize or otherwise tie-up memory and cause other media tasks to wait for these burst-mode accesses to complete. This can ultimately delay how long it takes to process each of the dispatched image frames 112 by each respective media task. For example, while it may take 9 milliseconds or less to prepare each image frame for live preview by the GPU without latencies caused by concurrent media tasks, memory contention can cause the same operation to take twice the amount of processing time, or more. As will be appreciated in light of this disclosure, this additional latency per each dispatched image frame can compound and add up to a substantially longer period of time before the electronic device 100 can put a CPU, GPU, or other processing stage, into a power-saving or "sleep" mode. So, as a result, memory bandwidth can become a bottleneck that prevents memory-constrained devices from performing such complex, concurrent media tasks on high-resolution, high-framerate image data without an undesirable increase in power consumption. Some such examples of memory-constrained devices include computing devices configured with memory controllers having low-frequency, single-channel 32-bit double-data rate (DDR) memory.

Thus, and in accordance with an embodiment of the present disclosure, techniques are disclosed to control a camera device such that memory contention and power consumption is reduced during performance of concurrent media tasks. As will be appreciated in light of this disclosure, these techniques are particularly well suited for low-cost, ultra-low power devices, but are also applicable to other electronic devices that perform concurrent media tasks utilizing shared memory. In an embodiment, a workload scheduler is implemented within a camera HAL and configured to dispatch image frames to competing media tasks in an alternating manner based on, for example, a dedicated hardware clock or other timing scheme. Note that such coordinated dispatching by a camera HAL allows each media task to receive captured image frames in a "round-robin" or turn-based fashion, thus giving each media task a dedicated period of time to perform video processing. To this end, techniques variously disclosed herein allow a given computing device to perform concurrent or so-called competing media tasks on captured high-definition video at high frame rates, without an undesirable decrease in device performance and without an excessive increase in power consumption.

As will be appreciated, the techniques disclosed herein utilize or otherwise work in conjunction with a camera HAL to control a camera subsystem within a given electronic device, and consequently, are compatible with numerous types of image sensors (e.g., CMOS, CCD, hybrid CCD/CMOS, or any other image sensor technology that can generate digital imagery) and ISPs. As will be further appreciated, the techniques can be implemented in various electronic devices that include an operating system (OS) configured to provide application-level access to the camera subsystem through the camera HAL. Some such examples include iOS and Android OS, but this disclosure should not be construed as limited to only these examples. Some such electronic devices can include, for example, smart phones, wearable computers, laptops, tablets, desktops, workstations, system-on-chip configurations, or other electronic devices that include a camera subsystem and the capability of performing current media tasks on captured image frames. Example embodiments may be implemented in hardware, software, firmware, or any combinations thereof.

For instance, one specific example embodiment can be implemented within an electronic device to provide scheduling within a camera HAL in order to dispatch image frames in a coordinated manner to two or more ongoing media tasks. In one such embodiment, a workload scheduler is implemented within the camera HAL, of the electronic device and configured to receive application-level requests, via an application framework or API, in order to control a camera subsystem and to initiate media tasks. In some cases, such media tasks may be initiated by, for example, a user selecting a user interface (UI) function on a display of an electronic device (e.g., a video record button). In some such cases, the request to initiate a media task specifies a desired resolution and framerate for captured video. In addition, the request can specify one or more media tasks including, for example, live-preview of image frames via a display, encoding, and recording of media files (e.g., raw (uncompressed), MPEG4, windows media video (WMV), audio video interlaced (AVI), and other suitable file formats). In an embodiment, the workload scheduler is configured to determine a suitable scheduling policy based on the requested characteristics of the image signal (e.g., the resolution and frame rate) and the total available system memory. For example, in a particular circumstance when two media tasks are to be performed concurrently, the workload scheduler can query the OS or otherwise determine if a suitable amount of memory is available to ensure that media tasks will be performed without potentially causing memory contention, and thus an undesirable increase in power consumption. Numerous factors may be utilized to determine if a requisite amount of memory is available, and for this reason, specific examples of memory size provided herein should not be construed as exhaustive or otherwise limiting. In cases where the workload scheduler determines there is sufficient memory to perform concurrent media tasks, the workload scheduler may apply a legacy scheduling policy such that image frames are dispatched in an immediate and unsynchronized manner, such as discussed with reference to FIG. 1. Conversely, in cases where the workload scheduler determines there is insufficient amount of memory to perform concurrent media tasks (e.g., because an unacceptable increase in power consumption could result), the workload scheduler can apply a scheduling policy that dispatches image frames in an alternating manner between image tasks based on, for example, a dedicated hardware clock or other suitable timing scheme.

In an embodiment, a display controller implemented within an electronic device may be utilized by the workload scheduler to dispatch image frames at a rate relative to a refresh rate controlled by the display controller. In this embodiment, the display controller may include, for instance, a vertical synchronization (VSYNC) event that occurs at a frequency equal to the refresh rate. For example, if the display controller is configured to operate a display at 60 HZ refresh rate, 60 VSYNC events will occur per second. To this end, and in accordance with an embodiment, the workload scheduler can utilize the VSYNC event to dispatch image frames to two concurrent media tasks in a round-robin fashion such that, for example, a first media task receives odd VSYNC event frames, and a second media task receives even VSYNC event frames. Within the context of a 60 HZ refresh rate, this means that each media task receives 30 dispatched frames per second, respectively. So, in this particular example embodiment, utilizing VSYNC events to dispatch image frames in an odd-even pattern enables a highly precise timing scheme that provides each media task a window of time to sequentially perform video processing without having to contend with other concurrent media tasks for memory access, and further allows performance of a given media task at a frame-rate that will not negatively impact user experience.

Note that while this particular specific example embodiment references VSYNC events, other high-precision clock sources accessible to the workload scheduler may be utilized and are within the scope of this disclosure. Further note that while a high-precision, dedicated clock is advantageous to achieving high frame rates (e.g., 30 fps or greater), it should be appreciated that a less precise clock may be utilized in applications that may not necessarily need high FPS performance. For instance, a software-based timer can be executed by a CPU of the electronic device, and may be utilized to generate an event at a regular interval of, for example, 10-100 milliseconds. Similar to the odd-even scheme discussed above, the workload scheduler can use this less-precise event to coordinate dispatching of image frames to concurrent media tasks. To this end, the techniques disclosed herein are not necessarily limited to one particular type of clock source (e.g., VSYNC events), and this disclosure should not be construed as limited in this regard.

System Architecture & Operation

Figure 2:
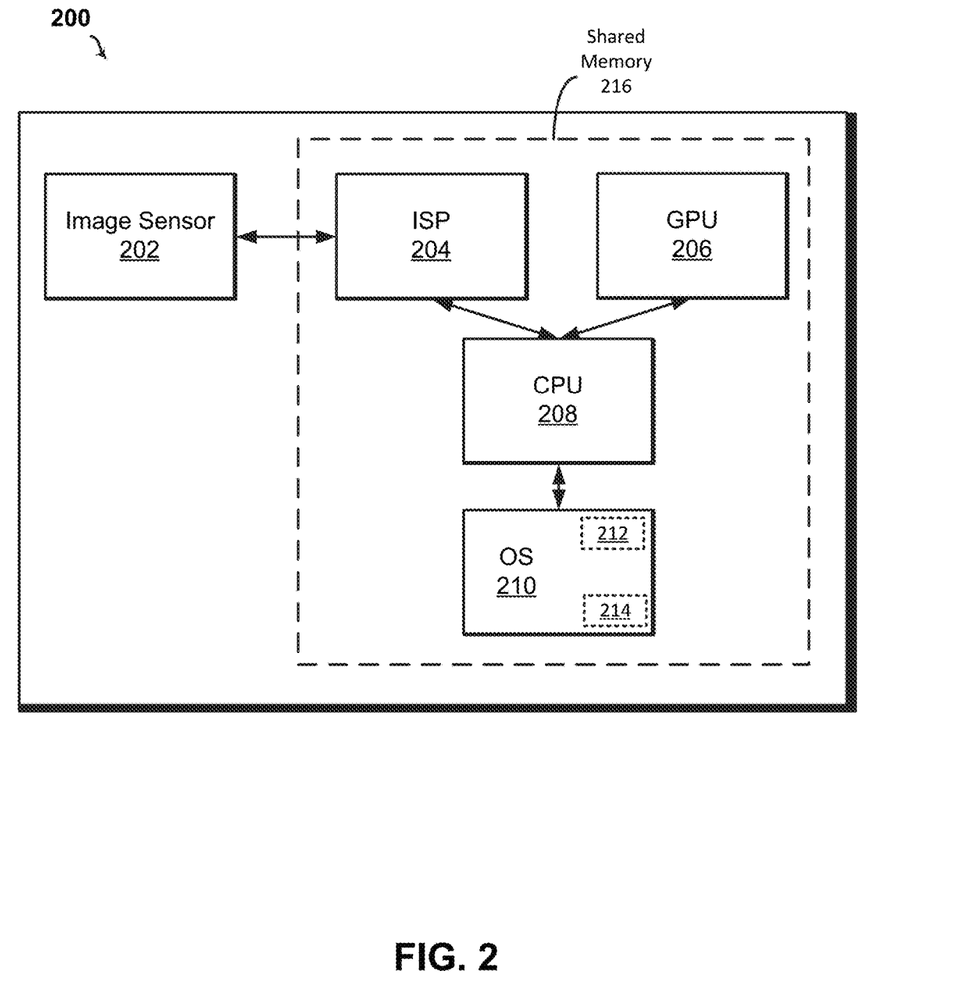
FIG. 2 illustrates an example electronic device configured with a camera HAL having an integrated workload scheduler, in accordance with an embodiment of the present disclosure.

Various embodiments disclosed herein are directed to implementing a workload scheduler within a camera HAL of an electronic device. FIG. 2 illustrates one such example electronic device 200 in accordance with an embodiment of the present disclosure. As can be seen, the electronic device 200 includes an image sensor 202, an ISP 204, a GPU 206, a CPU 208, an OS 210, a camera HAL 212, user-applications 214, and a shared memory 216. In various embodiments, one or more of the components shown in the electronic device 200 may be fully integrated and implemented within a single chip (e.g., a system-on-chip, application-specific integrated circuit (ASIC), field-programmable gate array (FPGA), or other suitable logic device), or in other embodiments, integrated in one or more separate chips and communicatively coupled to implement techniques variously disclosed herein. In some embodiments, the example electronic device comprises the example computing device 500 of FIG. 5.

Shared memory 216 may be implemented as, for example, any suitable volatile RAM, as would be conventionally utilized within electronic devices. Some such example RAM includes static random access memory (SRAM), dynamic random access memory (DRAM), synchronous DRAM (SDRAM), DDR SDRAM, Rambus DRAM (RDRAM), just to name a few. Note that some specific examples herein reference DDR-type memory, but other types of random access memory (RAM) may be utilized and is within the scope of this disclosure.

Image sensor 202 may be implemented as any type of sensor capable of capturing light and converting it into a proportional electrical signal including, for example, CMOS, CCD and hybrid CCD/CMOS sensors. Some such example sensors include, for instance, color image data (RGB), color and depth image data (RGBD camera), depth sensor, stereo camera (L/R RGB), YUV, infrared signals, and x-rays. Although a single image sensor 202 is depicted in FIG. 2, it should be appreciated additional sensors and sensor types can be utilized (e.g., multiple cameras arranged to photograph a scene from different perspectives) without departing from the scope of the present disclosure. To this end, image sensor 202 can be implemented as a number of different sensors depending on a particular application. For example, image sensor 202 may include a first sensor being an infrared detector, and a second sensor being a color-image sensor (e.g., RGB, YUV). In other examples, image sensor 202 may include a first sensor configured for capturing an image signal (e.g., color image sensor, depth-enabled image sensing (RGDB), stereo camera (L/R RGB), YUV, infrared, and x-ray) and a second sensor configured to capture image data different from the first image sensor.

ISP 204 may be implemented, for example, as an application-specific standard product (ASSP), or an application-specific integrated circuit (ASIC). In some cases, the ISP 204 comprises a number of independent processors/co-processors for processing an image signal from the image sensor 202. In addition, and in accordance with an embodiment, ISP 204 may comprise a number of conventional post-capture image processing modules (not shown) such as color correction, and image stabilization. In some cases, ISP 204 is capable of digitizing an image signal from the image sensor 202 (e.g., analog-to-digital conversion (ADC)). In other cases, additional analog stages, such as dedicated ADC integrated circuits (not shown) may convert raw image signals from image sensor 202 to digital image data.

The GPU 206 may be implemented, for example, as a CISC or RISC, x86 instruction set processors, multi-core, microcontroller, or an ASIC. In some embodiments, the GPU 206 may comprise dual-core processor(s), dual-core mobile processor(s), and so on. The CPU 208 may be implemented, for example, as CISC or RISC, x86 instruction set processors, multi-core, microcontroller, or an ASIC. In some embodiments, the CPU 208 may comprise dual-core processor(s), dual-core mobile processor(s), and so on. In an embodiment, the GPU 206 and the CPU 208 are utilized to perform video processing during on-going media tasks, and thus, can be accurately described as video processing stages or points. However, it should be appreciated that additional processing stages could be implemented in, for example, a system-on-chip (SOC), gate level logic, purpose-built silicon, a microcontroller, or any combination thereof.

The OS 210 may be implemented, for example, as Windows OS, Windows Mobile OS, iOS, Android OS, or any other suitable OS, as will be appreciated in light of this disclosure. As shown, the OS 210 includes a camera HAL 212. As discussed above, a camera HAL enables user-level applications to access the image sensor 202 and the ISP 204 to initiate image capture and receive captured image frames. In an embodiment, the camera HAL 212 comprises hardware, software, or any combination thereof. In an embodiment, the camera HAL 212 includes the workload scheduler 302 of FIG. 3 discussed below, and can be configured to perform the methodology 400 of FIG. 4. To this end, the workload scheduler 302 may comprise a plurality of instructions encoded on a computer-readable medium that when executed by at least one processor causes the methodology 400 of FIG. 4 to be carried out. In other cases, the workload scheduler 302 can be implemented in gate level logic or purpose-built silicon, or a microcontroller configured with input/output capability and embedded routines to carry out the methodology 400 of FIG. 4.

Also as shown, the OS 210 includes user-applications 214. In an embodiment, user-applications 214 can be implemented as any software process that is configured to initiate media tasks such as, for example, live-preview, encoding, and recording tasks. In an embodiment, each of the user-applications 214 can comprise a computer program product including machine-readable instructions compiled from C, C++, Java, Python or other suitable programming languages. These instructions may be stored on a non-transitory computer-readable medium, such as in a memory of a given computing device, and when executed cause a given media task to be performed. One such computing device 500 capable of instantiating and executing the user-applications 214 is discussed below with regard to FIG. 5.

In operation, the electronic device 200 can receive user input through a UI instantiated by the OS 210, or other suitable method such as a hardware button, to initiate image capturing and processing by the image sensor 202 and the ISP 204. In an embodiment, each of the user-applications 214 executed in the OS 210 can interface with the image sensor 202 and the ISP 204 utilizing the camera HAL 212, and can initiate media tasks such as, for example, live-preview of captured image frames, encoding, recording media files, and other video processing tasks as will be apparent in light of this disclosure. In some such cases, a given user-application can specify a resolution and framerate for video capture. In an embodiment, the HAL 212 implements a workload scheduler, such as the workload scheduler 302 of FIG. 3. In this embodiment, the workload scheduler 302 can be configured to perform the methodology 400 discussed below with regard to FIG. 4 to determine what scheduling policy to apply during performance of a given set of media tasks. In some cases, the workload scheduler 302 applies a legacy scheduling policy such that captured image frames are dispatched in an unsynchronized manner. In other cases, the workload scheduler 302 applies a scheduling policy that dispatches image frames in an alternating manner between media tasks based on, for example, a dedicated hardware clock or other suitable timing scheme, as discussed below with regard to FIGS. 3 and 4. Note that each of the ISP 204, CPU 206, CPU 208 and OS 210 each utilize the shared memory 216 during performance of media tasks.

Figure 3:
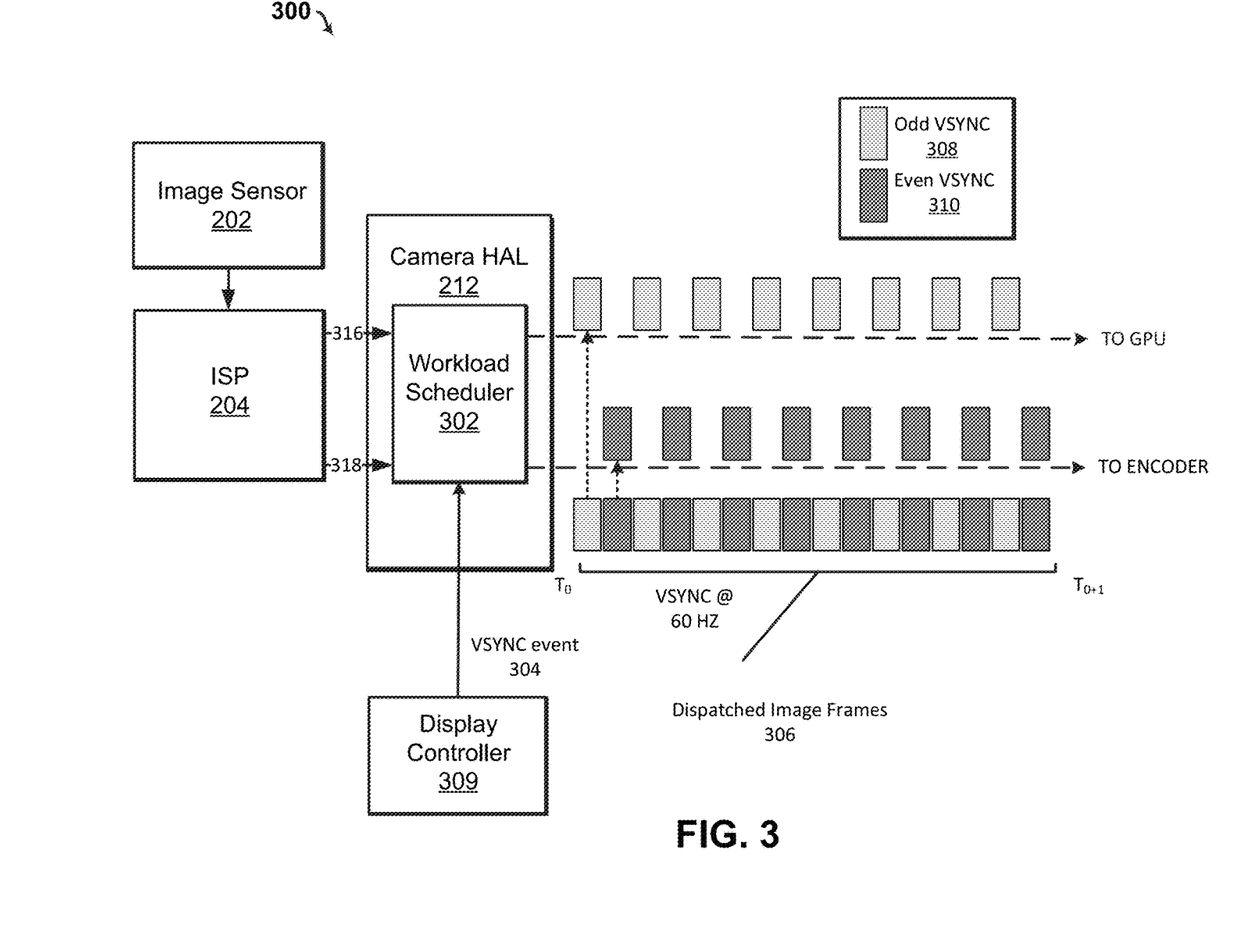
FIG. 3 shows one example process flow for the electronic device of FIG. 2, and depicts a workload scheduler within the camera HAL of FIG. 2 configured to dispatch image frames in an alternating manner to concurrently perform a plurality of image tasks, in accordance with an embodiment of the present disclosure.

Now referring to FIG. 3, with additional reference to FIG. 2, one example process flow 300 is shown for the electronic device 200 of FIG. 2, and depicts a workload scheduler 302 configured to dispatch image frames in an alternating manner to concurrently perform a first and second media task 316 and 318, respectively. Within the context of this specific example, the first media task 316 comprises a live-preview task that is performed, in part, by a GPU prior to displaying image frames on a display of the electronic device 200. In addition, the second media task 318 comprises a recording task that is performed, in part, by an encoder module within a GPU or other suitable hardware/software prior to writing image frames to a media file in a non-volatile memory.

In the example embodiment shown, the example process flow 300 includes the workload scheduler 302 implemented within the camera HAL 212, although the workload scheduler 302 may be implemented as a different chip or software module that is communicatively coupled with the camera HAL 212. Numerous variations and embodiments will be apparent in light of this disclosure. Each aspect of media task processing within the context of example process flow 300 will now be discussed in turn.

As discussed above with regard to FIG. 2, the camera HAL 212 can be implemented by the OS 210, and can be utilized by the user-applications 214 to initiate media tasks. To this end, and within the context of the example process flow 300, the media tasks 316 and 318 are the result of one or more of the user-applications 214 requesting the camera HAL 212 initiate video capture and processing. In turn, the camera HAL 212 utilizes the workload scheduler 302 to select a scheduling policy that is appropriate based on, for example, the capture settings (e.g., resolution and framerate) and the available memory bandwidth in the electronic device 200. One such example methodology 400 for selecting an appropriate scheduling policy is discussed below with regard to FIG. 4.

For instance, and as shown in the example embodiment of FIG. 3, the scheduling policy selected by the workload scheduler 302 is configured to dispatch image frames in an alternating fashion based on a VSYNC event signal 304 generated by a display controller 309. It should be appreciated that this disclosure is not limited to only VSYNC-type events and that other timing schemes and clock sources could be utilized, as will be apparent in light of this disclosure. As shown, the VSYNC event signal 304 is tied or otherwise equal to a refresh rate of the display controller 309. In the specific example shown, this includes a 60 HZ refresh rate, thus translating to the VSYNC event 304 occurring 60 times per second. In other embodiments, other refresh rates may be utilized and are within the scope of this disclosure. As will be appreciated in light of this disclosure, VSYNC events are particularly well suited for performing techniques disclosed herein as frames can be dispatched to media tasks in a precise manner.

Continuing the example embodiment of FIG. 3, the shared memory 216 of the electronic device 200 may comprise, for example, 1 GB of memory or less. In this instance, if the image frames captured are high-definition (e.g., 1080p) at a high frame rate (e.g., 30 fps), the 1 GB of memory would conventionally be a bottleneck that would cause memory contention to occur, and thus, an undesirable decrease in performance and an overall increase in power consumption. One such particular example was discussed above with regard to FIG. 1. However, and as can be seen, the workload scheduler 302 applies an alternating timing scheme such that each odd VSYNC event 308 causes an image frame to be dispatched to the first media task 316, and each even VSYNC event 310 causes an image frame to be dispatched to the second media task 318. This means that each of the media tasks 316 and 318 receive dispatched image frames in a synchronized manner and enables those workloads to be substantially non-overlapping. Note that although only half of the image frames per second will go to each respective media task 316 and 318 utilizing this timing scheme, this is not particularly problematic at a 60 HZ refresh rate, or better. This is so because at 60 HZ, or higher, each media task will be dispatched at least 30 frames per second, and thus, ensure that users do not perceive a drop in performance. Note that other refresh rates could be utilized, and this timing scheme is not limited to a 60 HZ refresh rate. So, because the workload scheduler 302 can adapt to the requirements of the media tasks 316 and 318 based on available memory within the electronic device 200, each of media task 316 and 318 can perform video processing without delays caused by memory contention. To this end, the electronic device 200 can comprise a low-cost, low-memory configured device that enables complex media tasks (e.g., high-resolution preview and recording) without sacrificing performance or increasing power consumption during performance of those media tasks.

Example Methodology

Figure 4:
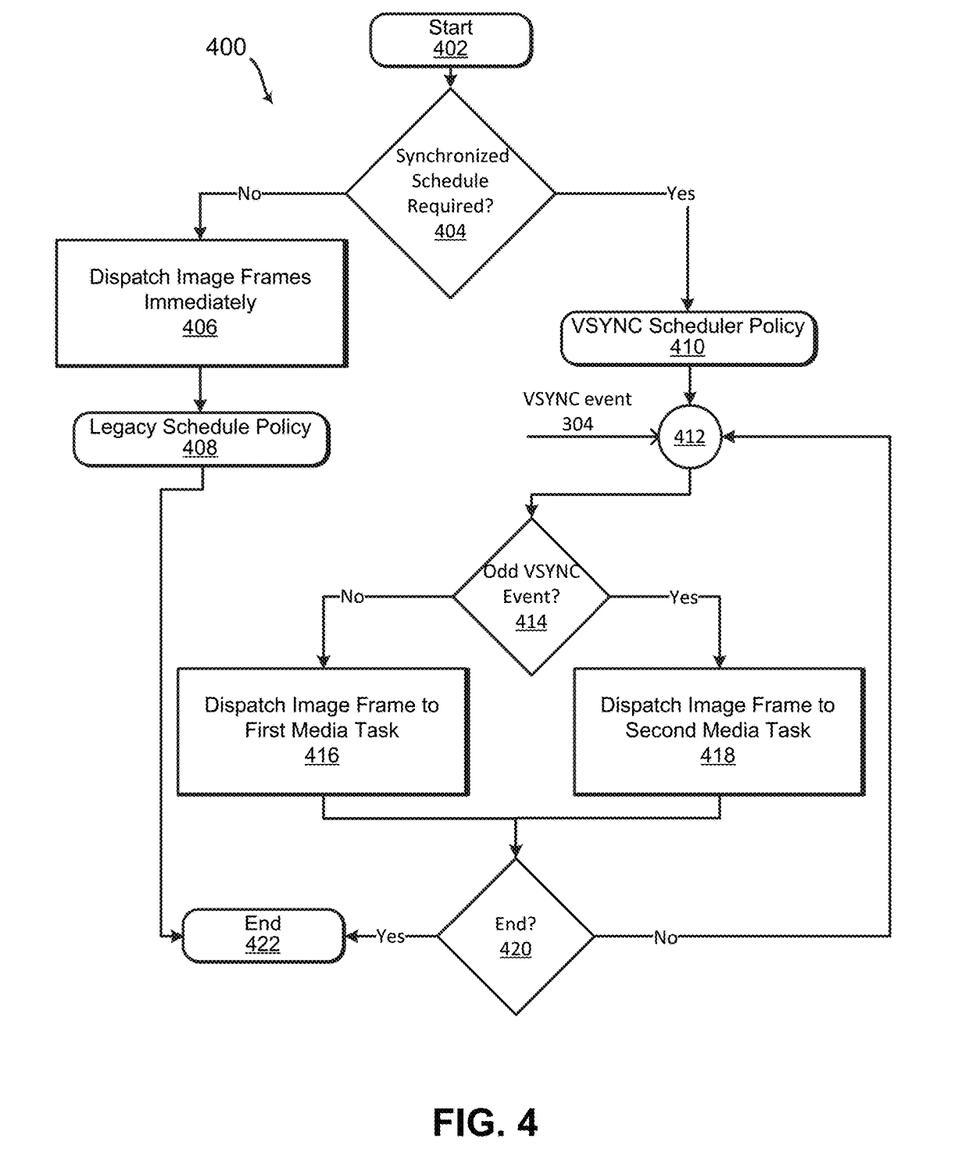
FIG. 4 shows one example methodology for enabling workload scheduling within a given camera HAL, in accordance with some embodiments of the present disclosure.

FIG. 4 shows one example methodology 400 for enabling workload scheduling within the camera HAL 212 of FIG. 2. As discussed above, such scheduling can be implemented by the workload scheduler 302. The methodology 400 begins in act 402.

In act 404, the workload scheduler 302 determines what scheduling policy to apply at an onset of media tasks such as a live-preview task and a recording task. In one embodiment, the workload scheduler 302 queries the OS 210 or otherwise determines the available memory bandwidth within a given device. Such determination can include a total memory size (e.g. in GBs), memory frequency, data channel size, and other technical characteristics that can impact the speed of read and write operations to the memory. As discussed above with regard to the electronic device 200 of FIG. 2, CPUs, GPUs and other hardware involved in the performance of media tasks may utilize a shared memory, such as the shared memory 216. To this end, the workload scheduler 302 can determine an appropriate scheduling policy to apply at an onset of media tasks based on factors such as, for example, the available memory bandwidth in a given electronic device, the requested resolution of the capture, the requested framerate of the capture, and the performance characteristics of the CPU/GPU or other hardware utilized during the performance of media tasks. In some cases, the workload scheduler 302 may implement a table or other set of values that enable each requested resolution and framerate to be looked-up or otherwise analyzed. In these cases, if a requested resolution and/or framerate exceed a particular threshold value within, for example, a table of threshold values indexed by resolution and framerate, the workload scheduler 302 can implement a scheduler policy that eliminates or otherwise mitigates memory contention. For example, if the workload scheduler 302 determines 1 GB of memory is available, requests to perform concurrent media tasks at 1080p and 30 frames per second may exceed such a threshold causing the workload scheduler 302 to apply an optimized policy that ensures memory contention is avoided. It should be appreciated that the particular threshold values implemented within a given device are dependent on multiple factors such as total memory available, processing stage performance capabilities, and other application-specific factors. To this end, these provided example thresholds should not be construed as limiting the present disclosure.

In some cases, the workload scheduler 302 may determine no optimized scheduling policy should be applied because, for example, the media tasks being performed do not require an amount of memory that would cause memory contention or otherwise increase power consumption in an undesirable way. In these cases, the methodology 400 continues to act 406, and immediately dispatches image frames to each respective media task, and then continues to act 408. In other cases, the workload scheduler 302 determines that an optimized scheduling policy is required to avoid performance drops and/or increased power consumption during performance of requested media tasks. In these cases, the methodology continues to act 410.

In act 408, the workload scheduler 302 applies a legacy schedule policy such that subsequent image frames captured during the performance of the media tasks are immediately dispatched once available. To this end, the camera HAL 212 continues to dispatch image frames immediately for the duration of the given media tasks. The method ends in act 422.

In act 410, the workload scheduler 302 applies a VSYNC scheduler policy, as described above with regard to FIG. 3. In some cases, such a policy may be applied when, for example, a requested set of media tasks requires high-definition resolution and high framerates such as, for example, 1080p, 576p, 480p, or any other memory/processor intensive resolution and framerate. It should be appreciated that this disclosure is not necessarily limited to a VSYNC timing scheme and that other timers may be utilized, depending on the application. In any such cases, the methodology continues to act 412.

In act 412, the workload scheduler 302 warts for the VSYNC event 304 to occur. As discussed above, the VSYNC event 304 signals at a rate that is governed by a refresh rate of the display controller 309. Once a VSYNC event 304 is received by the workload scheduler 302, the methodology continues to act 414.

In act 414, the workload scheduler 302 determines if the VSYNC event is an odd numbered event. In some cases, the workload scheduler 302 maintains a counter that increments each time a VSYNC event is received. The counter can be implemented, for example, in software or in hardware. To this end, at $T_0$ in the example embodiment shown in FIG. 3, the counter would be set to zero (0). After the first time the VSYNC event 304 is signaled, the workload scheduler increments the counter to one (1). Thus, at $T_0$ the counter indicates the VSYNC event 304 is an odd VSYNC event and the methodology continues to act 416.

In act 416, the workload scheduler 302 dispatches an image frame to a first media task. As discussed above, this first media task could be, for example, a live-preview of captured image frames. The methodology 400 continues to act 420 to determine if the media tasks have ended. For instance, a user may select a UI feature to stop or otherwise pause live-preview and video recording. In such cases, the methodology continues to act 422 and ends. In other cases, media tasks continue to be performed, and the methodology returns to act 412 and waits for the VSYNC event 304 to signal again. Subsequent VSYNC events after $T_0$ cause the counter to further increment during act 414. To this end, when the counter indicates an even VSYNC event, the methodology continues to act 418 and dispatches an image frame to a second media task. As discussed above, the second media task could be, for example, an encoding task that records captured image frames into a media file in volatile memory. The methodology 400 can continue to perform acts 412-418 until media tasks have completed or are otherwise ended by user-input.

Although the example methodology 400 includes dispatching image frames to two media tasks, additional media tasks could be serviced by the methodology 400. For example, the counter discussed above with regard to act 414 could be used to address media tasks 1 to N. For instance, a counter value of 1 can be used to dispatch an image frame to a first media task, a counter value of 2 can be used to dispatch an image frame to a second media task, and so on. Once the counter reaches a maximum value (e.g., frames have been dispatched to each of media tasks 1 to N), the counter may be reset back to 1, and this process can be repeated. To this end, the counter value may be used to iterate through a plurality of media tasks, with each media task being assigned a corresponding index starting at 1 and ending at N, and dispatch image frames accordingly. So, as should be appreciated in light of this disclosure, any number of concurrent media tasks may be performed by an electronic device utilizing the techniques various disclosed herein, and advantageously minimize memory contention and power consumption during the performance of ongoing media tasks.

Example System

Figure 5:
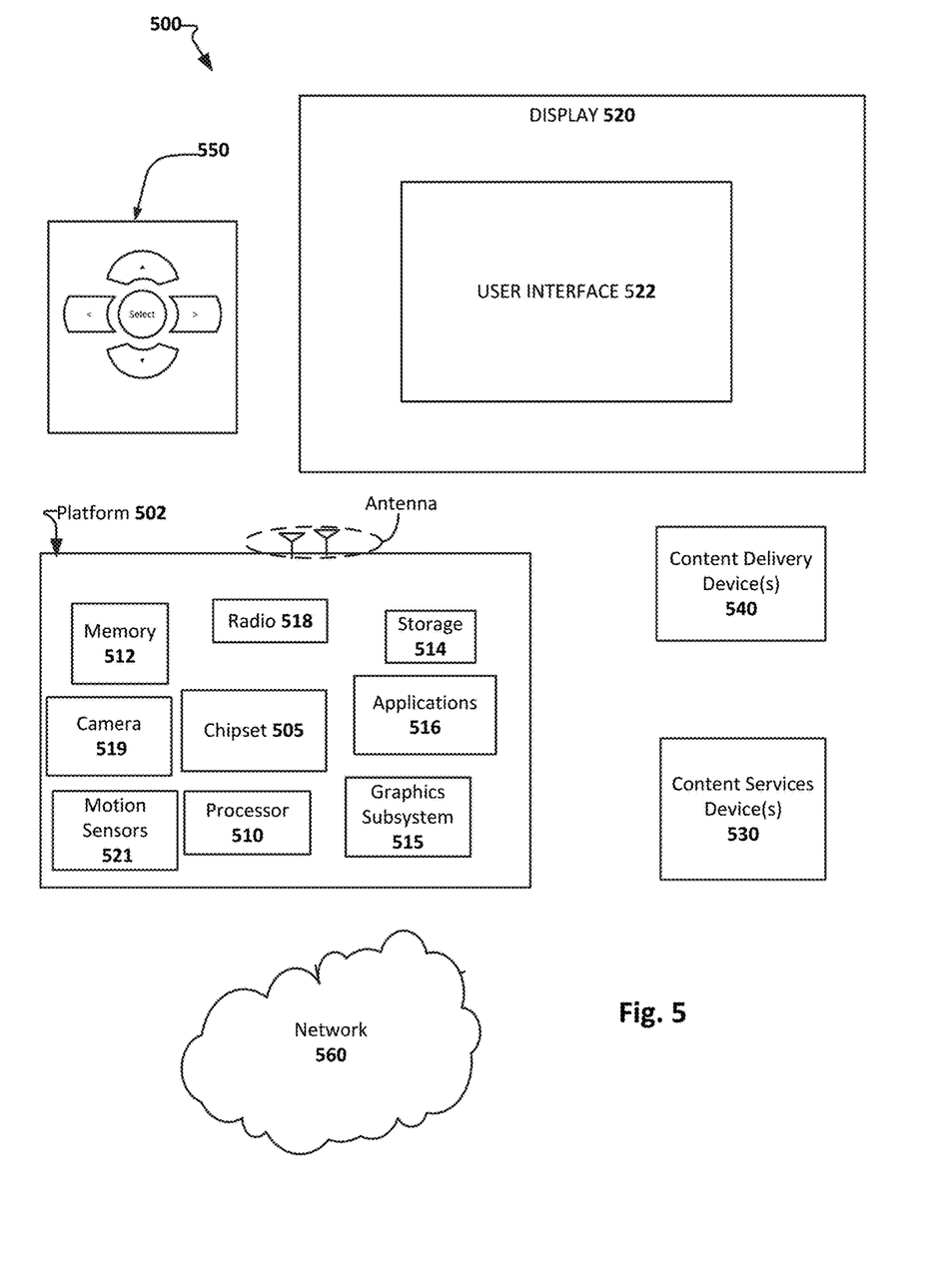
FIG. 5 illustrates a computer system configured with techniques for reducing memory contention and power usage utilizing a camera HAL with workload scheduling as variously disclosed herein, in accordance with an example embodiment of the present disclosure.

FIG. 5 illustrates a computing system 500 implemented with a camera HAL implementing a workload scheduler using the techniques disclosed herein, in accordance with various example embodiments. In some embodiments, system 500 may be a system for capturing and/or displaying still or moving images via a camera (not shown) although system 500 is not limited to this context. For example, system 500 may be incorporated into a personal computer (PC), laptop computer, wearable computing device, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 500 comprises a platform 502 coupled to a display 520. Platform 502 may receive content from a content device such as content services device(s) 530 or content delivery device(s) 540 or other similar content sources. A navigation controller 550 comprising one or more navigation features may be used to interact with, for example, platform 502 and/or display 520, so as to supplement navigational gesturing by the user. Each of these example components is described in more detail below.

In some embodiments, platform 502 may comprise any combination of a chipset 505, processor 510, memory 512, storage 514, graphics subsystem 515, camera 519, notion sensors 521, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 510 may comprise dual-core processor(s), dual-core mobile processor(s), and so forth. Memory 512 may be implemented, for instance, as a volatile memory device such as, but not limited to, a Random Access Memory (RAM), Dynamic Random Access Memory (DRAM), or Static RAM (SRAM). Storage 514 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 514 may comprise technology to increase the storage performance enhanced protection for valuable digital media when multiple hard drives are included, for example.

Graphics subsystem 515 may perform processing of images such as still or video for display, and in some embodiments is configured to synthesize face images, as variously described herein. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 could be integrated into processor 510 or chipset 505. Graphics subsystem 515 could be a stand-alone card communicatively coupled to chipset 505. The graphics and/or video processing techniques, including the techniques for identifying and producing preferred face orientations described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 518 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In some embodiments, content services device(s) 530 may be hosted by any national, international and/or independent service and thus accessible to platform 502 via the Internet or other network, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520. In some embodiments, content services device(s) 530 may comprise a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, graphics, text, medical and gaming content, and so forth.

Content services device(s) 530 receives content such as cable television programming including media information, digital information, and/or other content. Examples of content providers may include any cable or satellite television or radio or Internet content providers. The provided examples are not meant to limit the present disclosure. In some embodiments, platform 502 may receive control signals from navigation controller 550 having one or more navigation features. The navigation features of controller 550 may be used to interact with user interface 522, for example. In some embodiments, navigation controller 550 may be a pointing device that may be a computer hardware component (specifically human interface device) that allows a user to input spatial (e.g., continuous and multi-dimensional) data into a computer. Many systems such as graphical user faces (GUI), and televisions and monitors allow the user to control and provide data to the computer or television using physical gestures, facial expressions, or sounds.

Movements of the navigation features of controller 550 may be echoed on a display (e.g., display 520) by movements of a pointer, cursor, focus ring, or other visual indicators displayed on the display. For example, under the control of software applications 516, the navigation located on navigation controller 550 may be mapped to virtual navigation features displayed on user interface 522, for example. In some embodiments, controller 550 may not be a separate component but integrated into platform 502 and/or display 520. Embodiments, however, are not limited to the elements or in the context shown or described herein, as will be appreciated.

In some embodiments, drivers (not shown) may comprise technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 when the platform is turned "off." In addition, chipset 505 may comprise hardware and/or software support for 5.1 surround sound audio and/or high definition 5.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for con over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the 110 adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, video conference, streaming video, email or text messages, voice mail message, alphanumeric symbols, graphics, images (e.g., selfies, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 5.

Figure 6:
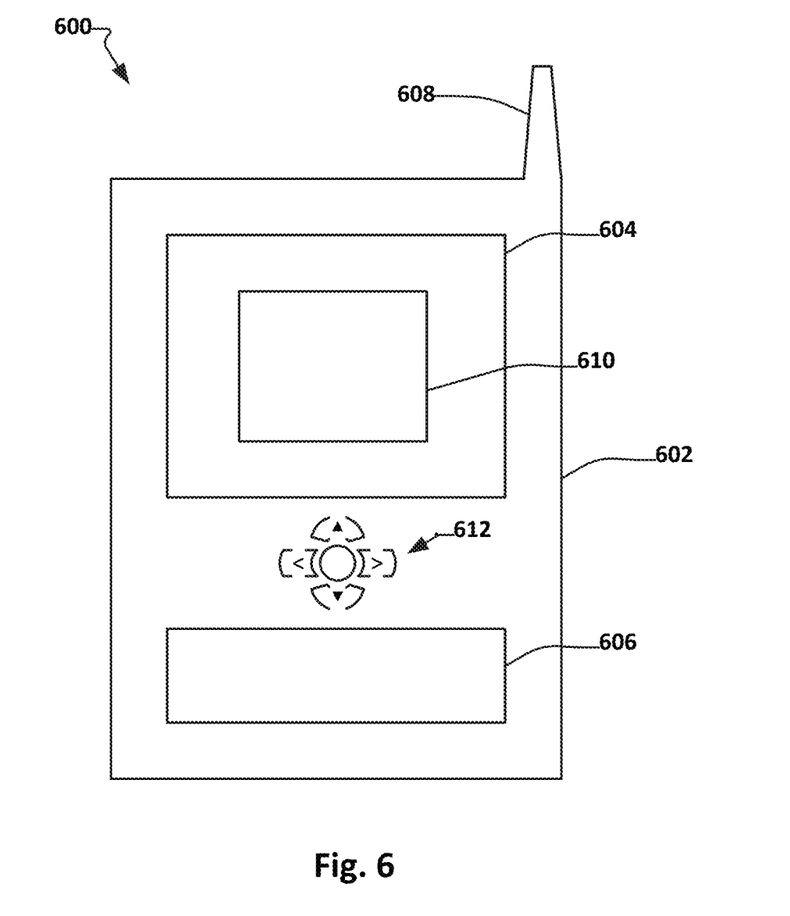
FIG. 6 shows a mobile computing system configured in accordance with an embodiment of the present disclosure.

As described above, system 500 may be embodied in varying physical styles or form factors. FIG. 6 illustrates embodiments of a small form factor device 600 in which system 500 may be embodied. In some embodiments, for example, device 600 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, mobile electronic device 600 may comprise a housing 602, a display 604, an input/output (I/O) device 606, and an antenna 608. Device 600 also may comprise navigation features 612. Display 604 may comprise any suitable display unit for displaying information appropriate for a mobile computing device, which in one example embodiment is a touchscreen display. I/O device 606 may comprise any suitable I/O device for entering information into a mobile computing device. Examples for I/O device 606 may include an alphanumeric keyboard, a numeric keypad, a touch pad, input keys, buttons, a camera, switches, rocker switches, microphones, speakers, voice recognition device and software, and so forth. Information also may be entered into device 600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, systems on-chip, semiconductor device, tips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

FURTHER EXAMPLE EMBODIMENTS

The following examples pertain to further embodiments, from which numerous permutations and configurations will be apparent.

Example 1 is an electronic device comprising a memory, a camera subsystem comprising an image sensor and an image signal processor (ISP), and a hardware abstraction layer (HAL) configured to communicatively couple to the camera subsystem and initiate image capture to perform media tasks based on input from a user-application, the HAL including a workload scheduler configured to dispatch captured image frames in an alternating manner to the media tasks such that video processing stages utilized during performance of the media tasks access the memory sequentially.

Example 2 includes the subject matter of Example 1, where the media tasks include at least one of a live-preview of image frames, encoding of image frames, transmitting image frames to a wireless display, and recording image frames to a media file.

Example 3 includes the subject matter of Examples 1-2, where the workload scheduler is further configured to dispatch image frames at a rate of at least 20 image frames per second based on receiving an event signal from a clock source signaling at that rate.

Example 4 includes the subject matter of Example 3, where the electronic device further comprises a display controller, and wherein the clock source is a hardware clock implemented within the display controller.

Example 5 includes the subject matter of Example 4, where the event signal generated by the display controller comprises a vertical synchronization (VSYNC) event.

Example 6 includes the subject matter of Example 3, where the clock source comprises a timer implemented in hardware or software.

Example 7 includes the subject matter of Examples 1-6, where the electronic device comprises a counter having a counter value that is incremented each time the workload scheduler receives an event signal.

Example 8 includes the subject matter of Example 7, where the media tasks comprise a first media task and a second media task, the first media task being a live-preview of image frames and the second media task being recording image frames to a media file.

Example 9 includes the subject matter of Example 7, where the media tasks comprise a first media task and a second media task, and the workload scheduler dispatches an image frame to the first media task if the counter value equals an odd value and dispatches an image frame to the second media task if the counter value equals an even value.

Example 10 includes the subject matter of Example 7, where be media tasks comprise N media tasks, and the workload scheduler indexes each media task starting at 1 and ending at N, and the workload scheduler dispatches an image frame to a given media task based on the counter value equaling a given index of that media task.

Example 11 includes the subject matter of Examples 1-10, where the video processing stages comprise at least one of a central processing unit (CPU), a graphics processing unit (GPU), a system-on-chip (SOC), gate level logic, a purpose-built silicon, and a microcontroller.

Example 12 includes the subject matter of Examples 1-11, where the memory is a shared resource between the video processing stages.

Example 13 includes the subject matter of Examples 1-12, where the memory is volatile random access memory (RAM) configured to write and read in a burst-mode.

Example 14 includes the subject matter of Examples 1-13, where the memory comprises single channel 32 bit double data-rate (DDR) memory.

Example 15 is a mobile electronic device comprising the electronic device of any of Examples 1-14.

Example 16 includes the subject matter of Example 15, where the HAL is implemented by a mobile operating system.

Example 17 includes the subject matter of Example 16, where the mobile electronic device comprises 1 gigabyte or less of volatile random access memory (RAM).

Example 18 is a non-transient computer-readable medium having a plurality of instructions encoded thereon that when executed by at least one processor cause a process to be carried out, the process being configured to initiate image capture by a camera subsystem based on input from a user-application to perform a first media task and a second media task, receive a plurality of event signals from a clock source at a predefined rate, and in response to receiving a first event signal of the plurality of event signals, dispatch a captured image frame from the camera subsystem to one of the first media task and the second media task; and in response to receiving a second event signal of the plurality of event signals, dispatch a captured image frame from the camera subsystem to the other of the first media task or the second media task.

Example 19 includes the subject matter of Example 18, where the first and second media tasks each comprise one of a live-preview of image frames, encoding of image frames, transmitting image frames to a wireless display, and recording image frames to a media file.

Example 20 includes the subject matter of Examples 18-19, where the user-application comprises a user interface (UI), and the input comprises receiving a user selection of a UI feature of the UI that enables presentation and recording of image frames captured by the camera subsystem.

Example 21 includes the subject matter of Examples 18-20, the process being further configured to maintain a counter such that each received event signal from the clock source causes a counter value associated with the counter to increment.

Example 22 includes the subject matter of Example 21, here each odd vale of the counter value causes a received event signal to dispatch an image frame to the first media task, and each even value of the counter value causes a received event signal to dispatch an image frame to the second media task.

Example 23 is a computer-implemented method for applying a workload scheduling policy in a camera hardware abstraction layer (HAL), the method comprising receiving a set of media tasks associated with image frames captured by a camera subsystem at an identified resolution and framerate, determining if available memory bandwidth to perform the set of media tasks is sufficient to avoid power consumption above a given target consumption threshold during performance of the set of media tasks, and in response to the available memory bandwidth being sufficient, applying a legacy workload scheduler policy, and in response to the available memory bandwidth being insufficient, applying an optimized workload scheduler policy such that image frames are dispatched by the camera HAL to each media task of the set of media tasks in an alternating manner.

Example 24 includes the subject matter of Example 23, where the act of determining whether the available memory bandwidth to perform video processing is sufficient further comprises comparing the identified resolution and framerate to a plurality of threshold values.

Example 25 includes the subject matter of Examples 23-24, where the plurality of threshold values are stored in a table in a memory, the table being indexed by resolution and framerate.

Example 26 includes the subject matter of Examples 23-25, where each media task of the set of media tasks comprises one of a live-preview of image frames, encoding of image frames, transmitting image frames to a wireless display, and recording image frames to a media file.

Example 27 includes the subject matter of Example 26, where the set of media tasks comprises a first media task configured to perform live-preview of image frames, and a second media task configured to record captured image frames to the media file.

Example 28 includes the subject matter of Example 27, where the act of applying the optimized workload scheduler policy further comprises receiving a plurality of event signals from a clock source at a predefined rate, and in response to receiving a first event signal of the plurality of event signals, dispatching a captured image frame from the camera subsystem to one of the first media task and the second media task, and in response to receiving a second event signal from the plurality of event signals, dispatching a captured image frame from the camera subsystem to the other of the first media task or the second media task.

Example 29 includes the subject matter of Example 28, where the predefined rate is at least 20 event signals per second.

Example 30 includes the subject matter of Example 28-29, where the plurality of event signals from the clock source are vertical synchronization (VSYNC) events.

Example 31 includes the subject matter of Examples 28-30, further comprising maintaining a counter such that each received event signal from the clock source causes a counter value associated with the counter to increment.

Example 32 includes the subject matter of Example 31, where the set of media tasks comprise a first media task and a second media task, and wherein each odd value of the counter value causes a received event signal to dispatch a captured image frame to the first media task, and each even value of the counter value causes a received event signal to dispatch a captured image frame to the second media task.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An electronic device comprising:
   a memory;
   a camera subsystem comprising an image sensor and an image signal processor (ISP); and
   a hardware abstraction layer (HAL) configured to communicatively couple to the camera subsystem and initiate image capture to perform media tasks based on input from a user-application, the HAL including a workload scheduler configured to dispatch captured image frames in an alternating manner to the media tasks such that video processing stages utilized during performance of the media tasks access the memory sequentially, wherein the memory is a single resource shared by the video processing stages, and the electronic device comprises a counter having a counter value that is incremented each time the workload scheduler receives an event signal,
   wherein the media tasks comprise a first media task and a second media task, and the workload scheduler dispatches an image frame to the first media task if the counter value equals an odd value and dispatches another image frame to the second media task if the counter value equals an even value.

2. The electronic device of claim 1, wherein the media tasks include a live-preview of image frames, encoding of image frames, transmitting image frames to a wireless display, recording image frames to a media file, or some combination of the live-preview of image frames, encoding of image frames, transmitting image frames to the wireless display, and recording image frames to the media file.

3. The electronic device of claim 1, wherein the workload scheduler is further configured to dispatch image frames at a rate of at least 20 image frames per second based on receiving an event signal from a clock source signaling at that rate.

4. The electronic device of claim 3, wherein the electronic device further comprises a display controller, and wherein the clock source is a hardware clock implemented within the display controller.

5. The electronic device of claim 4, wherein the event signal generated by the display controller comprises a vertical synchronization (VSYNC) event.

6. The electronic device of claim 3, wherein the clock source comprises a timer implemented in hardware or software.

7. The electronic device of claim 1, wherein the media tasks comprise a first media task and a second media task, first media task being a live-preview of image frames and the second media task being recording image frames to a media file.

8. The electronic device of claim 1, wherein the media tasks comprise N media tasks, and the workload scheduler indexes each media task starting at 1 and ending at N, and the workload scheduler dispatches an image frame to a given media task based on the counter value equaling a given index of the given media task, wherein N is a positive number greater than 1.

9. The electronic device of claim 1, wherein the video processing stages comprise at least one of a central processing unit (CPU), a graphics processing unit (GPU), a system-on-chip (SOC), gate level logic, a purpose-built silicon, and a microcontroller.

10. A mobile electronic device comprising the electronic device of claim 1.

11. A non-transient computer-readable medium having a plurality of instructions encoded thereon that when executed by at least one processor cause a process to be carried out, the process being configured to:
   initiate image capture by a camera subsystem based on input from a user-application to perform a first media task and a second media task;
   receive a plurality of event signals from a clock source at a predefined rate; and
   in response to receiving a first event signal of the plurality of event signals, dispatch a captured image frame from the camera subsystem to one of the first media task and the second media task; and
   in response to receiving a second event signal of the plurality of event signals, dispatch a captured image frame from the camera subsystem to the other of the first media task or the second media task.

12. The computer-readable medium of claim 11, wherein the first and second media tasks each comprise one of a live-preview of image frames, encoding of image frames, transmitting image frames to a wireless display, and recording image frames to a media file.

13. The computer-readable medium of claim 11, the process being further configured to maintain a counter such that each received event signal from the clock source causes a counter value associated with the counter to increment.

14. The computer-readable medium of claim 11, wherein each odd value of the counter value causes a received event signal to dispatch an image frame to the first media task, and each even value of the counter value causes a received event signal to dispatch an image frame to the second media task.

15. A computer-implemented method for applying a workload scheduling policy in a camera hardware abstraction layer (HAL), the method comprising:
   receiving a set of media tasks associated with image frames captured by a camera subsystem at an identified resolution and framerate;
   determining if available memory bandwidth to perform the set of media tasks is sufficient to avoid power consumption above a given target consumption threshold during performance of the set of media tasks; and
   in response to the available memory bandwidth being sufficient, applying a legacy workload scheduler policy; and
   in response to the available memory bandwidth being insufficient, applying an optimized workload scheduler policy such that image frames are dispatched by the camera HAL to each media task of the set of media tasks in an alternating manner.

16. The method of claim 15, wherein the act of determining whether the available memory bandwidth to perform video processing is sufficient further comprises comparing the identified resolution and framerate to a plurality of threshold values.

17. The method of claim 15, wherein each media task of the set of media tasks comprises one of a live-preview of image frames, encoding of image frames, transmitting image frames to a wireless display, and recording image frames to a media file.

18. The method of claim 17, wherein the set of media tasks comprises a first media task configured to perform live-preview of image frames, and a second media task configured to record captured image frames to the media file.

19. The method of claim 18, wherein the act of applying the optimized workload scheduler policy further comprises:
- receiving a plurality of event signals from a clock source at a predefined rate; and
- in response to receiving a first event signal of the plurality of event signals, dispatching a captured image frame from the camera subsystem to one of the first media task and the second media task; and
- in response to receiving a second event signal from the plurality of event signals, dispatching a captured image frame from the camera subsystem to the other of the first media task or the second media task.

20. The method of claim 19, wherein the predefined rate is at least 20 event signals per second.

21. The method of claim 19, wherein the plurality of event signals from the clock source are vertical synchronization (VSYNC) events.

22. The method of claim 19, further comprising maintaining a counter such that each received event signal from the clock source causes a counter value associated with the counter to increment, wherein the set of media tasks comprise a first media task and a second media task, and wherein each odd value of the counter value causes a received event signal to dispatch a captured image frame to the first media task, and each even value of the counter value causes a received event signal to dispatch a captured image frame to the second media task.

* * * * *